United States Patent
Kang et al.

(10) Patent No.: US 11,851,330 B2
(45) Date of Patent: Dec. 26, 2023

(54) WATER DISPERSIBLE GRAPHENE NANOSHEET

(71) Applicant: MEXPLORER. CO., LTD., Gyeonggi-do (KR)

(72) Inventors: Sung Oong Kang, Gyeonggi-do (KR); Si Woo Park, Incheon (KR); Byung Kwon Jang, Gyeonggi-do (KR)

(73) Assignee: MEXPLORER. CO., LTD., Gyeonggi-do (KR)

( * ) Notice: Subject to any disclaimer, the term of this patent is extended or adjusted under 35 U.S.C. 154(b) by 89 days.

(21) Appl. No.: 17/602,600

(22) PCT Filed: Apr. 9, 2020

(86) PCT No.: PCT/KR2020/004833
§ 371 (c)(1),
(2) Date: Oct. 8, 2021

(87) PCT Pub. No.: WO2020/209635
PCT Pub. Date: Oct. 15, 2020

(65) Prior Publication Data
US 2022/0204347 A1   Jun. 30, 2022

(30) Foreign Application Priority Data

Apr. 11, 2019 (KR) .................. 10-2019-0042597

(51) Int. Cl.
*C01B 32/184* (2017.01)
*C01B 32/194* (2017.01)
*C25B 1/29* (2021.01)

(52) U.S. Cl.
CPC .......... *C01B 32/184* (2017.08); *C01B 32/194* (2017.08); *C25B 1/29* (2021.01); *C01B 2204/22* (2013.01); *C01B 2204/32* (2013.01)

(58) Field of Classification Search
CPC . C01B 32/184; C01B 32/194; C01B 2204/22; C25B 1/29
See application file for complete search history.

(56) References Cited

U.S. PATENT DOCUMENTS

2016/0318766 A1   11/2016   Georgiou
2016/0347617 A1   12/2016   Zhang et al.
(Continued)

FOREIGN PATENT DOCUMENTS

CN   105131321 A   12/2015
CN   106315542 A    1/2017
(Continued)

OTHER PUBLICATIONS

Wang, Liang, et al. "Industrial production of ultra-stable sulfonated graphene quantum dots for Golgi apparatus imaging." Journal of Materials Chemistry B 5.27 (2017): 5355-5361.*
(Continued)

*Primary Examiner* — Richard M Rump
(74) *Attorney, Agent, or Firm* — Renner, Otto, Boisselle, & Sklar

(57) ABSTRACT

A graphene nanosheet and a manufacturing method therefor and, more particularly, to a water-dispersible graphene nanosheet and a manufacturing method therefor. The water-dispersible graphene nanosheet of the present invention is characterized in that at least a part of the end portion of a basal plane is sulfated.

14 Claims, 4 Drawing Sheets

(56) References Cited

U.S. PATENT DOCUMENTS

| | | | |
|---|---|---|---|
| 2017/0197837 A1 | 7/2017 | Jiang | |
| 2017/0197838 A1* | 7/2017 | Jiang | ............ C08J 7/12 |
| 2020/0376445 A1 | 12/2020 | Ahn et al. | |

FOREIGN PATENT DOCUMENTS

| | | |
|---|---|---|
| CN | 107235486 A | 10/2017 |
| KR | 101430361 B1 | 8/2014 |
| KR | 1020150121793 A | 10/2015 |
| KR | 20160072535 A | 6/2016 |
| KR | 1020170061121 A | 6/2017 |
| KR | 1020180040800 A | 4/2018 |
| KR | 1020180044615 A | 5/2018 |

OTHER PUBLICATIONS

Li, Zhenwei, et al. "Dispersion and parallel assembly of sulfonated graphene in waterborne epoxy anticorrosion coatings." Journal of Materials Chemistry A 7.30 (2019): 17937-17946.*

Abdolmaleki, A., et al. "Efficient and stable HER electrocatalyst using Pt-nanoparticles@ poly (3, 4-ethylene dioxythiophene) modified sulfonated graphene nanocomposite." International Journal of Hydrogen Energy 43.17 (2018): 8323-8332.*

Aziz, Md Abdul, and Sangaraju Shanmugam. "Sulfonated graphene oxide-decorated block copolymer as a proton-exchange membrane: improving the ion selectivity for all-vanadium redox flow batteries." Journal of Materials Chemistry A 6.36 (2018): 17740-17750.*

Jeon, In-Yup, et al. "Large-scale production of edge-selectively functionalized graphene nanoplatelets via ball milling and their use as metal-free electrocatalysts for oxygen reduction reaction." Journal of the American Chemical Society 135.4 (2013): 1386-1393.*

Ji, Junyi, et al. "Sulfonated graphene as water-tolerant solid acid catalyst." Chemical Science 2.3 (2011): 484-487.*

New-Generation Graphene from Electrochemical Approaches: Production and Applications.*

International Search Report dated Aug. 28, 2020, for International Patent Application No. PCT/KR2020/004833.

Jinlin Lu et al.; Self-assembled platinum nanoparticles on sulfonic acid-grafted graphene as effective electrocatalysts for methanol oxidation in direction methanol fuel cells; Scientific Reports; 2016; vol. 6, Article No. 21530.

Jun Liu et al.; Sulfated Graphene Oxide as a Hole-Extraction Layer in High-Performance Polymer Solar Cells; The Journal of Physical Chemistry Letters; 2012; pp. 1928-1933.

Search Report of the European Patent Office for corresponding European National Stage Application No. 20788015.4.

Markovic Zoran M et al, Antibacterial potential of electrochemically exfoliated graphene sheets, Journal of Colloid and Interface Science Academic Press,Inc, US, vol. 500, Apr. 2, 2017, pp. 30-43.

Markovic Z. M. et al, Semi-transparent, conductive thin films of electrochemical exfoliated graphene, RSC Advances, vol. 6, No. 45 Jan. 1, 2016 pp. 39275-39283.

Khaled Parvez et al,Exfoliation of Graphite into Graphene in Aqueous Solutions of Inorganic Salts, J. Am. Chem. Soc. vol. 136, No. 16, Apr. 9, 2014, pp. 6083-6091.

Office Action for corresponding Chinese National Stage Application No. 202080027947.5, dated Jul. 1, 2023 (translation of cited references and their respective relevance codes only).

Y. Sun, et al., "Interaction of sulfonated graphene oxide with U(VI) studied by spectroscopic analysis and theoretical calculations", Chemical Engineering Journal, copyright Elsevier B.V., 2016.

* cited by examiner

[Figure 1]
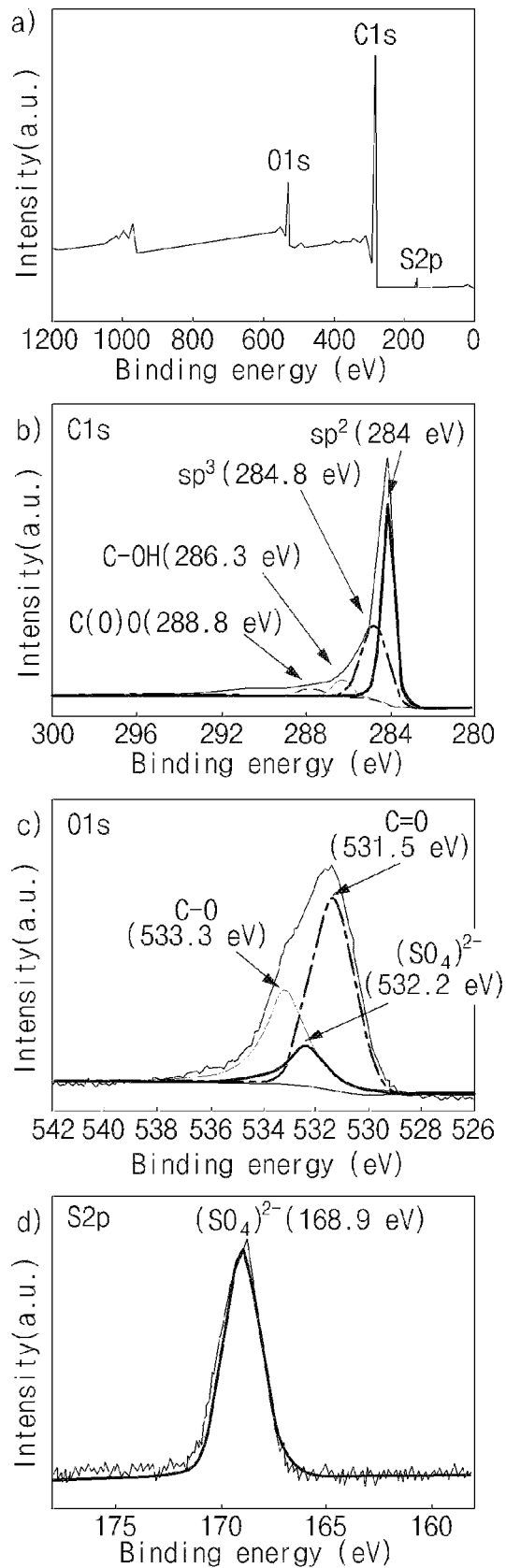

【Figure 2】
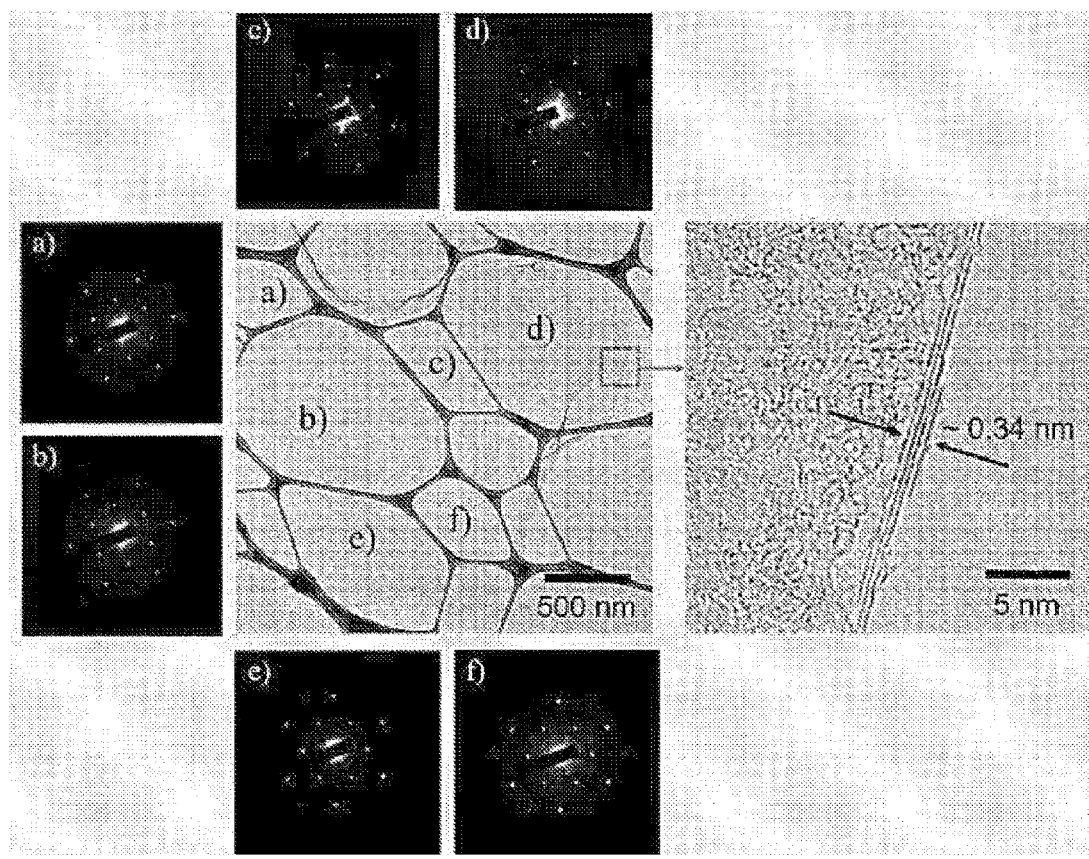
【Figure 3】
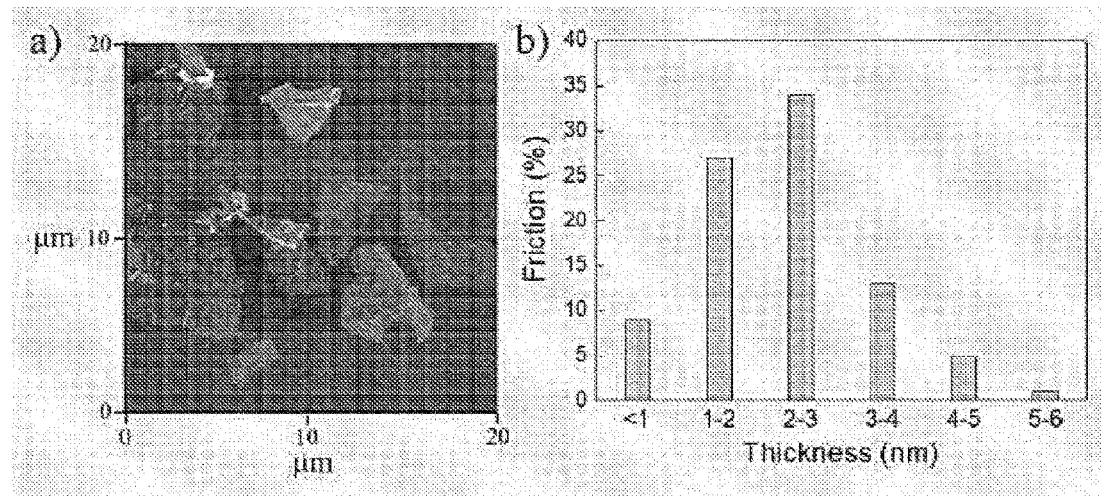

【Figure 4】
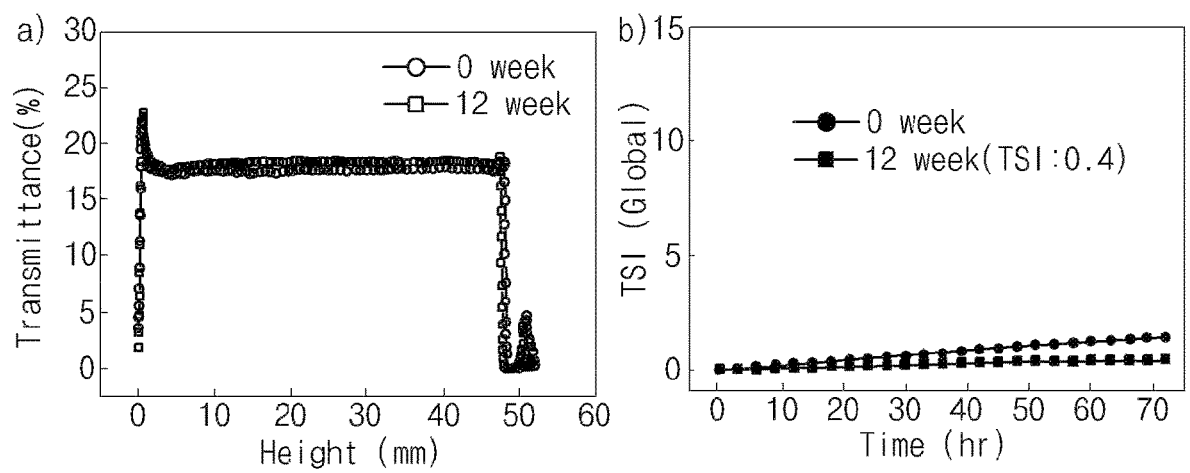

[Figure 5]
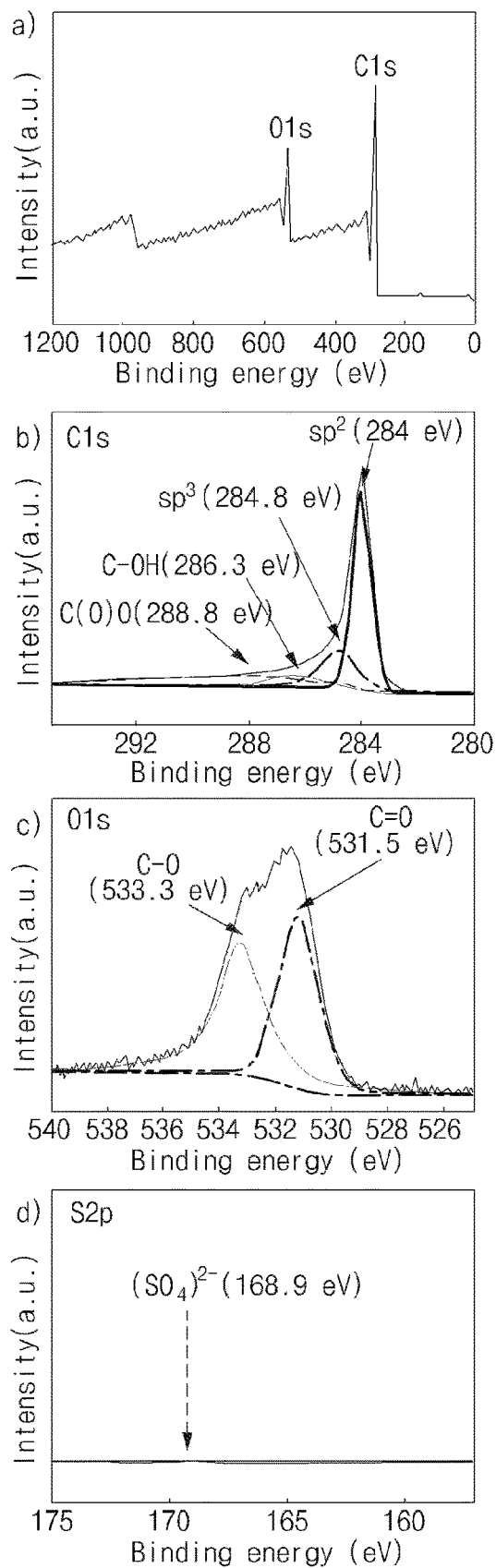

WATER DISPERSIBLE GRAPHENE NANOSHEET

This application is a national phase of International Application No. PCT/KR2020/004833 filed Apr. 9, 2020, which claims priority to Korea Application No. 20190042597 filed Apr. 11, 2019, the entire disclosures of which are hereby incorporated by reference.

TECHNICAL FIELD

The present invention relates to a graphene nanosheet and a manufacturing method thereof, and more particularly, to a water-dispersible graphene nanosheet and a manufacturing method thereof, and a composition comprising the graphene nanosheet.

BACKGROUND ART

Graphene is a carbon material in the form of a two-dimensional thin film in which carbon atoms with $sp^2$ hybrid orbitals are arranged in a crystal lattice structure of a hexagonal honeycomb structure and stacked with a thin atomic-level thickness. Graphene is a very stable material structurally and chemically, and it is reported that graphene has a tensile strength of about 130 GPa and a thermal conductivity of about 4,800-5,300 W/m K as well as high electrical properties of a maximum allowable current density of about $10^8$ A/cm$^2$ or more and a charge mobility of about 280,000 cm$^2$/V·s. A property of graphene as an excellent conductor is that it has charge mobility that is about 100 times faster than silicone, and it can conduct about 100 times more current than copper. In addition, it is known that graphene may have higher transmittance than indium tin oxide (ITO) used as a conventional transparent electrode. By using the properties of graphene as described above, studies to apply graphene are being conducted in various industrial fields.

Meanwhile, graphene is made of carbon, and is used in industrial fields only in a dispersed form mainly in an organic solvent after the surface of graphene is coated or chemical functional groups are bonded to the surface of graphene. However, in order to efficiently apply and implement the excellent properties of graphene in the material industry, since the technological and economic advantages of water-dispersible graphene nanosheets that are stably dispersed in water are very large, there has been a need for water-dispersible graphene nanosheets.

Accordingly, as a method for dispersing graphene in water, conventionally, there is known a method of oxidizing a graphite carbon layer to prepare graphene oxide in which oxygen functional groups are randomly coupled to a part of the carbon layer and using the same, or a method of sulfonating the oxygen functional groups randomly bonded to the graphene oxide as above, and substituting some or all of the oxygen functional groups with sulfonate functional groups, and thus locally restoring the conjugation structure and inducing a strong surface charge to disperse it in water. In addition, there is known a method of dispersing graphene nanosheets, which are produced by mechanical exfoliation of a graphite carbon layer, using an organic or inorganic dispersing agent.

However, the graphene oxide is known to significantly lose the mechanical, electrical, chemical and thermal properties of graphene, since an excessive amount of oxygen functional groups is randomly bound to the carbon layer and severely destroys the intrinsic structure of graphene. In addition, it is known that in the case of water-dispersible graphene through sulfonation of graphene oxide, since a multistep process of oxidation and reduction of graphene first, and sulfonation, etc. is required and the substitution of oxygen functional groups with sulfonate functional groups is local, it is difficult to offset the above-mentioned problems of structural distortion and degradation of graphene oxide. In addition, when graphene nanosheets produced by exfoliation of a graphite carbon layer are dispersed in water using an organic or inorganic dispersing agent, there is a disadvantage that the application of graphene nanosheets is greatly limited depending on the problems of the purity of the graphene nanosheets in the graphene composition containing the graphene nanosheets, the phase separation between the graphene nanosheets and dispersing agents, and the sedimentation of the graphene nanosheets, as well as the type and nature of the organic or inorganic dispersing agent used.

Therefore, in addition to known conventional methods, there is a continuing demand for graphene nanosheets with excellent water dispersibility while being simple and also improving the problems of structural distortion of graphene and consequent deterioration of physical properties.

DISCLOSURE

Technical Problem

It is an object of the present invention to provide a water-dispersible graphene nanosheet stably dispersed in water, a method for manufacturing the same, and a water-dispersible graphene composition comprising the water-dispersible graphene nanosheet. More specifically, it is an object of the present invention to provide a graphene nanosheet which can exhibit excellent mechanical, electrical, chemical and thermal properties of graphene and can be stably dispersed in water without using a separate dispersing agent, a method for manufacturing the same, and a graphene composition obtained using the same.

Technical Solution

In order to achieve the above object, the present invention provides a water-dispersible graphene nanosheet in which at least a part of the end portion of the basal plane of the carbon layer is sulfated.

In addition, the present invention provides a water-dispersible graphene composition comprising the water-dispersible graphene nanosheet according to the present invention and water, which is substantially free of a dispersing agent.

In addition, the present invention provides a method for manufacturing a water-dispersible graphene nanosheet comprising the steps of dipping at least one part of the positive electrode of a graphite material and the negative electrode of a metal material in an mixed electrolyte aqueous solution containing a persulfate salt which contains persulfate ion ($S_2O_8^{2-}$), a basic salt and a buffer, and inducing sulfation in the end portion of the graphene nanosheet derived from graphite by an electrochemical reaction, wherein the pH of the mixed electrolyte aqueous solution is maintained at 7 or more during the electrochemical reaction in the mixed electrolyte aqueous solution.

Advantageous Effects

The water-dispersible graphene nanosheet of the present invention can provide a water-dispersible graphene composition that can be stably dispersed in water, and more specifically has excellent dispersibility and dispersion stability without substantially using a dispersing agent while using water as a solvent. As a result, it is possible to provide various and easy methods of technical, economical and environmental application and utilization of materials using graphene.

In addition, the water-dispersible graphene nanosheet of the present invention can exhibit excellent mechanical, electrical, chemical and thermal properties inherent in graphene.

In addition, when the method for manufacturing a water-dispersible graphene nanosheet of the present invention is used, it is possible to provide a graphene nanosheet having excellent dispersibility in water as described above, and a graphene composition using the same.

DESCRIPTION OF DRAWINGS

The following drawings attached to this specification are for illustrating preferred embodiments of the present invention, and serve to facilitate understanding of the technical details of the present invention together with the above-described content of the present invention, and thus the present invention should not be construed as being limited only to the matters described in the drawings.

FIG. 1 shows a result of X-ray photoelectron spectroscopy (XPS) analysis of the water-dispersible graphene nanosheets according to the present invention.

FIG. 2 shows a result of transmission electron microscopy (TEM) observation of the water-dispersible graphene nanosheets according to the present invention.

FIG. 3 shows (a) a result of observation by an atomic force microscope for the water-dispersible graphene nanosheets according to the present invention, and shows (b) a result of statistical analysis of their thickness distribution after measurement by an atomic electron microscope.

FIG. 4 shows a result of observation of the water-dispersion stability of the water-dispersible graphene nanosheets according to the present invention through Turbiscan.

FIG. 5 shows a result of photoelectron spectroscopy analysis on the water-non-dispersible graphene nanosheets manufactured under the condition that the pH of the mixed electrolyte aqueous solution is maintained at 7 or less during the electrochemical reaction in the mixed electrolyte aqueous solution, unlike the manufacturing method of the water-dispersible graphene nanosheets according to the present invention.

BEST MODE

Water-Dispersible Graphene Nanosheet

As a result of intensive research to prepare a graphene nanosheet with excellent water dispersibility, the inventors of the present invention have manufactured a graphene nanosheet in which at least a part of the end portion of the basal plane of the graphene carbon layer is sulfated, and have found that the graphene nanosheet prepared in this way maintains the structure and physical properties of the basal plane inherent in graphene without destruction and distortion of the structure of carbon atoms in the basal plane of graphene by oxygen functional groups in graphene oxide, and has the property of being stably dispersed in water without a separate dispersing agent, and thus have completed the present invention.

More specifically, the water-dispersible graphene nanosheet according to the present invention can maintain a single-crystal carbon layer in the basal plane, and can exhibit excellent water dispersibility by excluding random oxidation of graphene and selectively sulfating the edge of graphene and thus inducing a strong surface charge.

The water-dispersible graphene nanosheet according to the present invention has a structure in which at least a part of the end portion of the carbon layer basal plane is sulfated. Specifically, the water-dispersible graphene nanosheet according to the present invention may have a structure in which the edge of the basal plane is selectively sulfated.

In the present invention, the basal plane may be composed of a single-crystal carbon layer, and the single-crystal carbon layer represents a carbon layer in which carbon atoms are regularly arranged in a hexagonal structure.

In the water-dispersible graphene nanosheet, at least a part of the end portion of the basal plane, more specifically, the edge is selectively sulfated, and thus polarity can be induced in the graphene nanosheet dispersed in water. More specifically, a negative (−) surface charge can be induced in graphene nanosheet dispersed in water. The effect of the present invention is, but is not limited to, that the 'water dispersibility' of the water-dispersible graphene nanosheet may be due to the polarity imparted by sulfate groups formed in at least a part of the end portion of the basal plane. In one embodiment, the zeta potential ($\zeta$) of the water-dispersible graphene nanosheet dispersed in water may be −25 mV or less ($\zeta \leq -25$ mV).

In the specification of the present invention, the zeta potential may have a measurement error depending on the measuring device, but may represent a value measured using a zeta potential measuring device (ELSZ-1000, OTSUKA Electronics after preparing an aqueous dispersion containing water-dispersible graphene nanosheets at a concentration of 0.01 wt. % using water as a solvent.

In one embodiment, the degree of sulfation of the water-dispersible graphene nanosheet can be confirmed by the ratio of sulfur and carbon atoms on the graphene nanosheet, and the ratio of sulfur and carbon atoms (S/C ratio) in the water-dispersible graphene nanosheet according to the present invention may be, but is not limited to, for example, 0.005 to 0.05, and in one embodiment, 0.008 to 0.02. If the ratio of sulfur and carbon atoms is within the above range, there may be an effect of excellently exhibiting water dispersibility.

In the specification of the present invention, the ratio of sulfur and carbon atoms represents the ratio of these atomic concentrations based on the value of each atomic concentration (%) of carbon and sulfur measured using X-ray photoelectron spectroscopy (XPS).

In addition, the average diameter of the basal plane of the water-dispersible graphene nanosheet may be, but is not limited to, 0.1 to 10 μm, specifically 0.5 to 5 μm, and the average thickness of the basal plane may be, but is not limited to, 1 to 6 nm, specifically 2 to 4 nm. If the average diameter and average thickness of the basal plane of the water-dispersible graphene nanosheet are within the above ranges, it has a very large specific surface area and can have the effect of exhibiting excellent mechanical, electrical and thermal properties.

In the specification of the present invention, the average diameter of the basal plane means a statistical value after measuring the diameter of each of 100 water-dispersible graphene nanosheets among a plurality of graphene nanosheets coated on a silicone oxide ($SiO_2$) substrate, and the average diameter may be a value measured according to a commonly used method, for example, a value measured using an atomic force microscope (AFM). In addition, the average thickness of the basal plane means a statistical value after measuring the thickness of each of 100 water-dispersible graphene nanosheets among a plurality of graphene nanosheets coated on a silicone oxide ($SiO_2$) substrate, and the average thickness may be a value measured according to a commonly used method, for example, a value measured using an atomic force microscope.

Water-Dispersible Graphene Composition

In one aspect, the present invention may provide a water-dispersible graphene composition comprising a water-dispersible graphene nanosheet according to the present invention, and water. Also, the water-dispersible graphene composition may substantially not comprise a dispersing agent, due to the excellent water dispersibility of the water-dispersible graphene nanosheet.

In the specification of the present invention, the dispersing agent refers to a material optionally added to improve the water dispersibility of the water-dispersible graphene nanosheet, and the type thereof is not limited, and for example, it may refer to a known organic dispersing agent and an inorganic dispersing agent. The organic dispersing agent may be, but is not limited to, for example, saturated and unsaturated carboxylic acids having 1 to 20 carbon atoms such as formic acid, acetic acid, propionic acid, butanoic acid, hexanoic acid, heptanoic acid, octanoic acid, nonanoic acid, decanoic acid, undecanoic acid, lauric acid, myristic acid, palmitic acid, stearic acid, oleic acid, linoleic acid, and linolenic acid, hydroxycarboxylic acids, alicyclic and aromatic carboxylic acids having 6 to 34 carbon atoms. In addition, as alkenyl succinic anhydride, octenyl succinic anhydride, dodecenyl succinic anhydride, hexadecenyl succinic anhydride, etc. may be mentioned. As an organic dispersing agent having a thiol group, for example, alkanethiols such as mercaptoethanol, mercapto-2-propanol, 1-mercapto-2,3-propanediol, 3-mercaptopropyltrimethoxysilane, mercaptosuccinic acid, hexanethiol, pentanedithiol, dodecanethiol, undecanethiol, and decanethiol may be mentioned. The organic dispersing agent having a phenol ring may be, for example, triphenylphosphine, tributylphosphine, trioctylphosphine, tributylphosphine and the like. organic dispersing agent having an amino group may be, for example, propylamine, butylamine, hexylamine, heptylamine, octylamine, 2-ethylhexylamine, nonylamine, decylamine, dodecylamine, hexadecylamine, oleylamine and the like.

In addition, a known surfactant that can also be used as a dispersing agent may not be comprised, and such surfactant may comprise, for example, an anionic surfactant, a nonionic surfactant, an amphoteric surfactant, and a cationic surfactant. The anionic surfactant may be, for example, higher fatty acid salts, alkylsulfonates, α-olefinsulfonate, alkanesulfonic acid salts, alkylbenzenesulfonate salts, sulfosuccinic acid ester salts, alkyl sulfuric acid ester salts, alkyl ether sulfuric acid ester salts, alkyl phosphoric acid ester salts, alkyl ether phosphoric acid ester salts, alkyl ether carboxylates, α-sulfone fatty acid methyl ester salt, or methyl taurates. The nonionic surfactant may be, for example, glycerin fatty acid ester, polyglycerol fatty acid ester, sucrose fatty acid ester, sorbitan fatty acid ester, polyoxyethylene sorbitan fatty acid ester, polyoxyethylene alkyl ether, polyoxyethylene alkylphenyl ether, polyoxyethylene fatty acid ester, fatty acid alkanolamide, alkylglycoside and the like. The amphoteric surfactant may be, for example, alkyl betaine, fatty acid amide propyl betaine, alkylamine oxide and the like. The cationic surfactant may be, for example, alkyltrimethylammonium salt, dialkyldimethylammonium salt, alkyldimethylbenzylammonium salt, alkylpyridinium salt and the like. In addition, polymer surfactants such as fluorine-based surfactants, cellulose derivatives, polycarboxylates, and polystyrene sulfonates can be exemplified.

The water-dispersible graphene composition comprises water as a solvent and is substantially free of a dispersing agent, wherein the term 'substantially free' means that the content of the dispersing agent is 5% by weight or less, for example 4% by weight or less, 3% by weight or less, 2% by weight or less, 1% by weight or less, or 0% by weight (i.e., not comprising at all) based on the total weight of the composition comprising the water and the water-dispersible graphene nanosheet.

The water-dispersible graphene composition includes a water-dispersible graphene nanosheet according to the present invention, wherein the water-dispersible graphene nanosheet may be composed of, for example, a single layer, may comprise a laminate of water-dispersible graphene nanosheets composed of a plurality of carbon layers, and may comprise a mixture form thereof, but it is not limited thereto.

In addition, the content of the water-dispersible graphene nanosheet in the water-dispersible graphene composition may be adjusted as necessary and is not limited thereto, but for example, it may be comprised in an amount of 0.01 to 10% by weight based on the total weight of the composition.

The water-dispersible graphene composition may exhibit excellent water-dispersibility and water-dispersion stability. Specifically, the water-dispersible graphene composition may exhibit a change in optical transmittance of 5% or less when stored at room temperature for 12 weeks, and may exhibit excellent water-dispersibility as well as water-dispersion stability. In one embodiment, the change in optical transmittance may represent 5% or less, preferably 1% to 4%, more preferably 0.1% to 3%, and most preferably 0.01% to 2%.

In the specification of the present invention, the optical transmittance may be measured using a known method. In one embodiment, in order to measure the water-dispersion stability of the water-dispersible graphene composition, the change in optical transmittance can be calculated and expressed by using the measured value of optical transmittance (%) immediately after preparing using Turbiscan (Turbiscan Lab Expert, Leanontech) equipment (light source: near infrared ray of 880 nm) and the measured value after 12 weeks of storage at room temperature, after preparing a water-dispersible graphene composition containing 0.01% by weight of water-dispersible graphene nanosheet using water as a solvent.

Manufacturing Method of Water-Dispersible Graphene Nanosheet

In one aspect, the present invention provides a method for manufacturing the water-dispersible graphene nanosheet.

The method for manufacturing the water-dispersible graphene nanosheet comprising the steps of dipping at least one part of the positive electrode of a graphite material and the negative electrode of a metal material in a mixed electrolyte aqueous solution containing a persulfate salt, which contain persulfate ion ($S_2O_8^{2-}$); a basic salt; and a buffer, and inducing sulfation in the end portion of the graphene nanosheet derived from graphite by an electrochemical reaction. Specifically, in order to induce sulfation in the end portion of graphene nanosheet, the pH of the mixed electrolyte aqueous solution is maintained at 7 or more during the electrochemical reaction in the mixed electrolyte aqueous solution.

Specifically, after the mixed electrolyte aqueous solution and the positive electrode of a graphite material and the negative electrode of a metal material were prepared to prepare a reaction furnace for the electrochemical reaction, when an electric field is applied after dipping at least one part of the positive electrode and the negative electrode into the prepared mixed electrolyte aqueous solution, persulfate ions in at least one part, specifically, the edge of the end portion of the carbon layer of the graphite, which is the material of the positive electrode, may be electrochemically reacted to induce sulfation. The sulfation reaction in at least a part of the end portion of the carbon layer induced through the electrochemical reaction in the electric field may be expressed by Equation 1 below. In the following Reaction Scheme 1, C—H represents a bond present in the edge of carbon layer in graphite, and the persulfate ion is present in a mixed electrolyte aqueous solution containing a persulfate salt, indicating that an edge-sulfated graphene nanosheet is formed.

[Reaction Scheme 1]

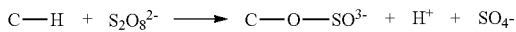

First, in order to induce selective sulfation at the edge of the graphite carbon layer by the electrochemical reaction, a electrolyte aqueous solution containing a persulfate salt which contains persulfate ions should be prepared. The electrolyte aqueous solution containing a persulfate salt may be directly prepared and used, or a commercially available product may be obtained and used, but is not limited thereto.

Specifically, the electrolyte aqueous solution containing a persulfate salt may comprise at least one selected from the group consisting of ammonium persulfate ($(NH_4)_2S_2O_8$), potassium persulfate ($K_2S_2O_8$), and sodium persulfate ($Na_2S_2O_8$). In order to prepare the electrolyte aqueous solution containing a persulfate salt, at least one selected from the group consisting of ammonium persulfate, potassium persulfate, and sodium persulfate is added to distilled water and stirred to prepare a persulfate electrolyte aqueous solution, but the preparation method is not limited thereto. In this case, the molar concentration of persulfate ions in the aqueous solution of the persulfate electrolyte is preferably in the range of 0.01 M to 2 M.

The inventors of the present invention have confirmed through an experiment that since the persulfate ions contained in the mixed electrolyte aqueous solution containing a persulfate salt are hydrolyzed when the pH of the mixed electrolyte aqueous solution is 7 or less, it is difficult to induce sulfation in a part of the end portion of the carbon layer through the electrochemical reaction. Therefore, the mixed electrolyte aqueous solution can be prepared by adding a basic salt in addition to the persulfate salt to adjust the pH to 7 or more, preferably to 8 or more. In this case, the basic salt that may be added may be, but is not limited to, for example, at least one selected from the group consisting of lithium hydroxide, sodium hydroxide, potassium hydroxide, ammonium hydroxide, lithium carbonate, sodium carbonate and potassium carbonate. When adding the basic salt, in order to prepare a homogeneous electrolyte aqueous solution, it is preferable to use them after mixing and stirring them. At this time, the amount of the basic salt to be added is preferably added so that the pH of the mixed electrolyte aqueous solution containing the persulfate salt and the basic salt is adjusted within the range of 8 to 13.

In addition, during the electrochemical reaction in the mixed electrolyte aqueous solution containing the persulfate salt and the basic salt, the pH of the mixed electrolyte aqueous solution must be stably maintained at 7 or more to prevent hydrolysis of persulfate ions and thus to stably induce sulfation of the edge of the carbon layer. Therefore, it is preferable to additionally add a buffer to maintain the pH of the mixed electrolyte aqueous solution containing the persulfate and the basic salt at 7 or more during the electrochemical reaction. At this time, the buffer to be added may be, but is not limited to, for example, at least one selected from the group consisting of ammonium acetate, ammonium carbonate, ammonium nitrate, methylammonium acetate, methylammonium carbonate, methylammonium sulfate, methylammonium nitrate, lithium bicarbonate, sodium bicarbonate, potassium bicarbonate, lithium acetate, sodium acetate, potassium acetate, lithium sulfate, sodium sulfate, potassium sulfate, lithium dihydrogen phosphate, sodium dihydrogen phosphate and potassium dihydrogen phosphate, and it is preferable to mix them and then stir them, in terms of homogeneity of the mixed electrolyte aqueous solution. At this time, the amount of the buffer to be added is preferably added so that the pH of the mixed electrolyte aqueous solution containing the persulfate salt, the basic salt and the buffer is adjusted within the range of 8 to 13.

In order to induce sulfation in at least a part of the end portion of the carbon layer constituting the graphene nanosheet by using the mixed electrolyte aqueous solution containing the persulfate salt, the basic salt, and the buffer, a graphite material is used as an anode (positive electrode) for electrochemical reaction. As a positive electrode of such a graphite material, if it is formed of a graphite material, its shape is not particularly limited, but, for example, a known graphite rod or graphite foil may be used. In addition, it is preferable to use a metal material as a cathode (negative electrode), and for example, a known metal wire, metal foil, or metal mesh may be used, but the reduction electrode of a metal material is also not particularly limited in its shape.

For the electrochemical reaction, at least one part of the positive electrode and the negative electrode is dipped in the mixed electrolyte aqueous solution prepared above containing the persulfate salt, the basic salt and the buffer, and a constant voltage or constant current is applied to the positive electrode, and a constant voltage or constant current is applied to the positive electrode to induce sulfation at the edge of the graphite carbon layer. At this time, it is preferable to adjust the constant voltage applied to the positive electrode in the range of +1 to +30 volts (V), and when applying a constant current, it is preferable to apply in the range of 1 to 50 amperes (A) in terms of stability of the reaction.

The water-dispersible graphene nanosheet sulfated at the end portion of the carbon layer through the electrochemical reaction is floated in a mixed electrolyte aqueous solution or sedimented at the bottom of the reaction vessel, after the electrochemical reaction. It is preferable to collect the prepared water-dispersible graphene nanosheets and wash them sufficiently with distilled water to completely remove remaining persulfate salts, basic salts and/or buffers. Thereafter, a water-dispersible graphene composition can be prepared by adding an excessive amount of distilled water to the washed water-dispersible graphene nanosheets and using commercially available ultrasonication. The water-dispersible graphene composition is in the form of a dispersion, and as described above, it exhibits excellent effects in water dispersibility and water-dispersion stability even without substantially including a dispersing agent.

The preparation amount, the degree of sulfation, and the zeta potential, etc. of the prepared water-dispersible graphene nanosheet can be controlled in a wide range by the concentration of the persulfate salt in the mixed electrolyte aqueous solution containing the persulfate salt and the basic salt and the buffer, the pH of the mixed electrolyte, the applied constant voltage or constant current value, and the electrochemical reaction time, but it is preferable to maintain the pH of the mixed electrolyte aqueous solution at 7 or more during the electrochemical reaction.

Hereinafter, the present invention will be described in detail with reference to examples and the like in order to help the understanding of the present invention. However, the examples according to the present invention may be modified in various other forms, and the scope of the present invention should not be construed as being limited to the following examples. The examples of the present invention are provided in order to more completely explain the present invention to a person having ordinary knowledge in the field to which the present invention pertains.

Example 1. Manufacture of Water-Dispersible Graphene Nanosheet

First, ammonium persulfate was added to distilled water and stirred to prepare a 0.35 M electrolyte aqueous solution containing a persulfate salt. Lithium hydroxide as a basic salt and ammonium acetate as a buffer were additionally added to the 0.35 M electrolyte aqueous solution containing the persulfate salt prepared above, and then stirred to adjust the pH of the mixed electrolyte containing the persulfate salt, the basic salt and the buffer to 11. After dipping the positive electrode of graphite foil and the negative electrode of platinum foil into the prepared mixed electrolyte aqueous solution, a constant current of 5 A was applied to the positive electrode to perform an electrochemical reaction for 1 hour. The electrochemical reaction was started from pH 11, which is the initial pH of the mixed electrolyte aqueous solution, and was terminated after 1 hour when the pH of the mixed electrolyte was dropped to about pH 7. In order to confirm the thickness, radius, structure and composition of the thus prepared water-dispersible graphene nanosheet, photoelectron spectroscopy (XPS) analysis, transmission electron microscopy (TEM) analysis, and atomic force microscope (AFM) analysis were performed, and the results are shown in FIGS. 1 to 3.

Hereinafter, it will be described in detail with reference to the drawings.

FIG. 1 is a graph showing the results of photoelectron spectroscopy (X-ray photoelectron spectroscopy, XPS, AXIS Ultra DLD, Kratos) analysis of the water-dispersible graphene nanosheet, which shows the results of measurement and analysis of the chemical composition and chemical bonds of water-dispersible graphene nanosheets using photoelectron spectroscopy.

Referring to the XPS survey spectrum of the wide binding energy range of a) of FIG. 1, it is possible to confirm the C1s, O1s, S2p XPS peaks of the water-dispersible graphene nanosheet according to the present invention. Referring to the C1s XPS peaks of b) of FIG. 1 for more detailed chemical composition and chemical bond analysis, it can be confirmed that the carbon (C) atoms of the water-dispersible graphene nanosheet according to the present invention are composed of only carbon-carbon bonds ($sp^2$ and $sp^3$) and carbon-oxygen bonds (C—OH and C(O)O). Specifically, from the above results, since the water-dispersible graphene nanosheet does not contain a carbon-sulfur (C—S) bond, it can be inferred that the carbon atom is not sulfonated (C—$SO_3H$, sulfonate) by bonding with sulfur, but is sulfated (C—O—$SO_3H$, sulfate). Also, more specifically, referring to the O1s peaks in c) of FIG. 1, sulfate ($SO_4^{2-}$, 532.2 eV) bond in addition to carbon-oxygen bond (C—O and C=O) was directly observed. Referring to the S2p peak of d) of FIG. 1, it can be confirmed that a sulfate bond ($SO_4^{2-}$, 168.9 eV) rather than a sulfonate ($SO_3^{2-}$) bond was directly observed. Through this, it can be confirmed that in the nanosheet of water-dispersible graphene according to the present invention, at least a part of the end portion of the basal plane is sulfated.

FIG. 2 shows the results of transmission electron microscopy (TEM, JEOL) observation of the water-dispersible graphene nanosheet according to the present invention. Through the results of the TEM observation, it can be confirmed that the edges of the nanosheets of the water-dispersible graphene were selectively sulfated.

Specifically, referring to the results of TEM observation of FIG. 2, the water-dispersible graphene nanosheet may be composed of a single-crystal carbon layer, and it can be seen that this single-crystal carbon layer has a radius of several micrometers and is a graphene nanosheet composed of a plurality of thin carbon layers. More specifically, referring to a) to f) of FIG. 2, it can be seen that the basal plane of the water-dispersible graphene nanosheet is a single-crystal graphene nanosheet in which carbon atoms were regularly arranged in a hexagonal crystal structure. a) to f) of FIG. 2 show points at which a Selected Area Electron Diffraction (SAED) patterns for the water-dispersible graphene nanosheet were observed. In the structure of graphene composed of $sp^2$ covalent bonds of carbon-carbon atoms, if the sulfate bond to the carbon atom bonded to the basal plane is induced, the arrangement of the carbon atoms in the hexagonal structure is distorted and dislocated, and thus the single-crystal diffraction pattern shown in the SAED result cannot be observed. Therefore, from the TEM result of FIG. 2, it can be confirmed that the basal plane of the water-dispersible graphene nanosheet according to the present invention is composed of the single-crystal graphene nanosheet composed of $sp^2$ covalent bonds between carbon—carbon atoms, and the edge is selectively sulfated. Through this, it can be confirmed that in the water-dispersible graphene nanosheet according to the present invention, the carbon-carbon covalent bond in graphene is not dissociated and sulfated, but only the C—H bond at the edge is selectively sulfated.

FIG. 3 is a result of statistical analysis after measuring the radius and thickness distribution of the water-dispersible graphene nanosheets according to the present invention with an atomic force microscope (Atomic Force Microscopy, AFM, Park System AFM).

From the result of AFM observation of a plurality of water-dispersible graphene nanosheets shown in a) of FIG. 3, it can be seen that the water-dispersible graphene nanosheets according to the present invention have an average radius of several micrometers or more, specifically, an average radius of 0.5 to 5 micrometers. In addition, based on the results of AFM thickness measurement for 100 water-dispersible graphene nanosheets shown in b) of FIG. 3, it can be seen that the water-dispersible graphene nanosheets according to the present invention are mostly (about 99%) composed of graphene nanosheets having an average thickness of 5 nanometers (nm) or less.

Example 2. Evaluation of Sulfation of Graphene Nanosheet Depending on pH of Mixed Electrolyte Aqueous Solution The degree of sulfation of the water-dispersible graphene nanosheets according to the present invention is mainly determined by the pH of the mixed electrolyte aqueous solution containing a persulfate salt, a basic salt and a buffer.

To confirm this, first, the concentration of the ammonium persulfate electrolyte was fixed to 0.35 M, and the initial pH of the mixed electrolyte aqueous solution containing ammonium persulfate, a basic salt (lithium hydroxide) and a buffer (ammonium acetate) was adjusted to 8, 9, 10, 11, 12, and 13, respectively. A constant current of 5 A was applied to the positive electrode of the graphite material in the mixed electrolyte aqueous solution, and the electrochemical reaction was performed for 1 hour to prepare water-dispersible graphene nanosheets. At this time, the addition amount of buffer (ammonium acetate) was adjusted so that the final pH of the mixed electrolyte aqueous solution is equally terminated at about pH 7 after 1 hour of the electrochemical reaction.

The degree of sulfation of the edge of the water-dispersible graphene nanosheet prepared at the initial pH condition of each mixed electrolyte aqueous solution was analyzed by measuring the atomic concentrations (%) of carbon and sulfur using photoelectron spectroscopy (X-ray photoelectron spectroscopy, XPS, AXIS Ultra DLD, Kratos).

Table 1 shows the atomic concentration (%) of carbon and sulfur and the atomic ratio of sulfur/carbon (S/C) of the water-dispersible graphene nanosheet prepared when the initial pH is adjusted to 8, 9, 10, 11, 12, and 13 before the start of the electrochemical reaction of each of the mixed electrolyte aqueous solution.

TABLE 1

| | Peak/Initial pH | | | | | |
|---|---|---|---|---|---|---|
| | pH 8 | pH 9 | pH 10 | pH 11 | pH 12 | pH 13 |
| C 1s | 90.17 | 89.83 | 89.28 | 88.38 | 89.12 | 87.76 |
| S 2p | 0.72 | 0.90 | 1.16 | 1.41 | 1.60 | 1.49 |
| S/C ratio | 0.008 | 0.010 | 0.013 | 0.016 | 0.018 | 0.017 |

Example 3. Evaluation of the Surface Charge of Water-Dispersible Graphene Nanosheets Depending on the Degree of Sulfation The water-dispersible graphene nanosheet prepared in Example 2 was dispersed in water to prepare a dispersion having a concentration of 0.01% by weight, and then the zeta potential was measured using a zeta potential meter (ELSZ-1000, OTSUKA Electronics).

Table 2 shows the zeta potential of the dispersion containing water-dispersible graphene nanosheets prepared when the initial pH of the mixed electrolyte aqueous solution is adjusted to 8, 9, 10, 11, 12, and 13 under the condition that the final pH is about 7 after 1 hour of electrochemical reaction in the persulfate mixed electrolyte aqueous solution.

TABLE 2

| | Initial pH | | | | | |
|---|---|---|---|---|---|---|
| | 8 | 9 | 10 | 11 | 12 | 13 |
| Surface charge (mV) | −25.4 | −28.73 | −30.91 | −33.34 | −34.68 | −34.40 |

As can be seen in Table 2, it can be seen that the water-dispersible graphene nanosheet according to the present invention exhibits surface charges of different sizes when dispersed in water depending on the degree of sulfation induced at the edge of the carbon layer. The reason that the water-dispersible graphene nanosheet according to the present invention exhibits a strong negative (−) surface charge in a state of being dispersed in water can be explained by the very large ionization constant of the sulfate functional group induced at the edge of the carbon layer. For example, the ionization constant of the sulfite ion is $Ka1=1.2\times10^{-2}$.

Example 4. Preparation of Water-Dispersible Graphene Composition and Evaluation of Water-Dispersion Stability The initial pH of the mixed electrolyte aqueous solution among the manufacturing conditions of the water-dispersible graphene nanosheets was adjusted to 11, and a constant current of 5 A was applied to the graphite oxidation electrode in the mixed electrolyte to cause an electrochemical reaction for 1 hour, and then the final pH of the mixed electrolyte was adjusted to about 7 to prepare water-dispersible graphene nanosheets. After preparing a water-dispersible graphene composition containing the prepared water-dispersible graphene nanosheet in an amount of 0.01% by weight, the dispersion stability was measured for 12 weeks (light source used: near-infrared ray of 880 nm). The results of observation of the water-dispersion stability of the water-dispersible graphene composition including the prepared water-dispersible graphene nanosheet using Turbiscan (Turbiscan Lab Expert, Leanontech) equipment are shown in FIG. 4.

As can be seen in FIG. 4, it was confirmed that after 12 weeks of Turbiscan measurement, the optical transmittance (%) of the graphene composition was increased from 17% to 19%, and the water-dispersion stability was very good with a Turbiscan stability index (TSI) value of about 0.4.

From the above results, it was confirmed that in the case of the water-dispersible graphene nanosheet according to the present invention, the edges of the carbon layer are sulfated and the basal plane is composed of a single-crystal carbon layer, due to the electrochemical reaction in the mixed electrolyte aqueous solution containing a persulfate salt, a basic salt and a buffer. In addition, it was confirmed that a graphene composition with good water dispersibility and water-dispersion stability can be prepared without using an organic or inorganic dispersing agent, due to the sulfate functional group induced at the edge of the carbon layer.

Comparative Example 1. Evaluation of the Effect of pH of Mixed Electrolyte Aqueous Solution During Electrochemical Reaction in Mixed Electrolyte Aqueous Solution for Preparation of Water-Dispersible Graphene For the preparation of the water-dispersible graphene nanosheet according to the present invention in which at least a part of the end portion of the basal plane of the carbon layer is sulfated, the pH of the mixed electrolyte maintained during the electrochemical reaction is very important.

To confirm this, the concentration of ammonium persulfate electrolyte was fixed to 0.35 M, and basic salt was added to adjust the initial pH of the persulfate mixed electrolyte aqueous solution to 11. However, unlike the mixed electrolyte aqueous solution, the addition of the buffer added to maintain the pH of the mixed electrolyte during the electrochemical reaction at 7 was omitted.

In order to evaluate the effect of the pH of the mixed electrolyte aqueous solution during the electrochemical reaction in the mixed electrolyte aqueous solution for the preparation of the water-dispersible graphene nanosheet, the same constant current value of 5 A was applied to the oxidation electrode of graphite foil, and electrochemical reaction was performed for 1 hour. It was confirmed that the pH of the mixed electrolyte aqueous solution to which the buffer is not added starts to decrease rapidly from the initial pH 11 after the start of the electrochemical reaction, and the pH of the mixed electrolyte aqueous solution (containing only a persulfate salt and a basic salt) changes to about 2 after 1 hour of the electrochemical reaction. Since the graphene nanosheet prepared by electrochemical reaction in the aqueous solution of the mixed electrolyte that does not contain the buffer is not dispersed in water, after sufficiently washing with aqueous solution, the same ultrasonication process was performed to prepare an organic solvent graphene nanosheet dispersion using dimethyl formamide (DMF) organic solvent. The results of photoelectron spectroscopy analysis of graphene nanosheets (dispersed in the prepared DMF) are shown in FIG. 5.

FIG. 5 is a graph showing the results of photoelectron spectroscopy (X-ray photoelectron spectroscopy, XPS, AXIS Ultra DLD, Kratos) analysis of graphene nanosheets prepared by electrochemical reaction in a mixed electrolyte aqueous solution lacking the buffer, which shows the results of measurement and analysis of the chemical composition and chemical bonds of graphene nanosheets dispersed in the organic solvent using photoelectron spectroscopy.

Referring to the XPS survey spectrum of the wide binding energy range in a) of FIG. 5, only the C1s and O1s XPS peaks of the graphene nanomembrane prepared by electrochemical reaction in a mixed electrolyte composed only of the persulfate salt and basic salt can be confirmed. This is a result that the S2p XPS peak is not observed, as compared with the XPS survey spectrum of the water-dispersible graphene nanosheet specified and shown in Example 1 and FIG. 1, and means that the chemical bonds of carbon-sulfur and oxygen-sulfur are absent. Referring to the C1s XPS peak of FIG. 5 b) for analysis of more detailed chemical composition and chemical bonds, it can be confirmed that the carbon (C) atoms in the graphene nanomembrane prepared by electrochemical reaction in the mixed electrolyte composed only of a persulfate and a basic salt consist only of carbon-carbon bonds ($sp^2$ and $sp^3$) and carbon-oxygen bonds (C—OH and C(O)O). This is the same result as the C1s XPS peak of the water-dispersible graphene nanosheet specified and shown in Example 1 and FIG. 1.

However, more specifically, referring to the O1s peak in FIG. 5 c), unlike the water-dispersible graphene nanosheets specified and shown in Example 1 and FIG. 1, only the bonds between carbon-oxygen atoms (C—O and C=O) are observed, and it can be observed that the sulfate ($SO_4^{2-}$, 532.2 eV) bond, which is the bond between oxygen-sulfur atoms, is absent. More specifically, referring to the S2p peak of d) of FIG. 5, unlike the water-dispersible graphene nanosheets specified and shown in Example 1 and FIG. 1, it can be confirmed that no S2p XPs peaks including sulfonate ($SO_3^{2-}$) and sulfate bonds ($SO_4^{2-}$, 168.9 eV) were observed. This is an important result indicating that by maintaining the pH of the mixed electrolyte aqueous solution at 7 or more during the electrochemical reaction in the mixed electrolyte aqueous solution according to the present invention consisting of a persulfate salt, a basic salt and a buffer, at least a part of the end portion of the finally manufactured graphene nanosheet may be selectively sulfated to prepare a water-dispersible graphene nanosheet.

The invention claimed is:

1. A water-dispersible graphene nanosheet in which at least a part of the edge of a basal plane of a carbon layer is sulfated to comprise a carbon-sulfate bond of C—O—$SO_3$H or C—O—$SO_3$.

2. The water-dispersible graphene nanosheet according to claim 1, wherein the basal plane of the carbon layer is composed of a single-crystal carbon layer.

3. The water-dispersible graphene nanosheet according to claim 1, wherein zeta potential of the water-dispersible graphene nanosheet is ($\zeta$)≤−25 mV.

4. The water-dispersible graphene nanosheet according to claim 1, wherein the atomic ratio of sulfur/carbon (S/C) of the water-dispersible graphene nanosheet is 0.005 to 0.05.

5. The water-dispersible graphene nanosheet according to claim 1, wherein the average diameter of the basal plane of the carbon layer is 0.1 to 10 μm.

6. The water-dispersible graphene nanosheet according to claim 1, wherein the average thickness of the basal plane is 1 to 6 nm.

7. A water-dispersible graphene composition comprising the water-dispersible graphene nanosheet of claim 1; and water, wherein the water-dispersible graphene composition is substantially free of a dispersing agent.

8. The water-dispersible graphene composition according to claim 7, wherein the water-dispersible graphene composition comprises a single layer composed of a plurality of water-dispersible graphene nanosheets, or its laminate.

9. The water-dispersible graphene composition according to claim 7, wherein the water-dispersible graphene composition contains 5% by weight or less of a dispersing agent based on the total weight of the water-dispersible graphene composition, and the dispersing agent comprises at least one of an organic dispersing agent and an inorganic dispersing agent.

10. A method for manufacturing a water-dispersible graphene nanosheet comprising the steps of dipping at least a part of a positive electrode of a graphite material and a negative electrode of a metal material into a mixed electrolyte aqueous solution containing a persulfate salt, which contains persulfate ion ($S_2O_2^{2-}$); a basic salt; and a buffer, and inducing sulfation in the end portion of the graphene nanosheet derived from graphite by an electrochemical reaction,
wherein the pH is maintained at 8 to 13 during an electrochemical reaction in the mixed electrolyte aqueous solution.

11. The method for manufacturing the water-dispersible graphene nanosheet according to claim 10, wherein the persulfate salt contained in the mixed electrolyte aqueous solution comprises at least one selected from the group consisting of ammonium persulfate (($NH_4)_2S_2O_8$), potassium persulfate ($K_2S_2O_8$), and sodium persulfate ($Na_2S_2O_8$).

12. The method for manufacturing the water-dispersible graphene nanosheet according to claim 10, wherein the molar concentration of the persulfate salt contained in the mixed electrolyte aqueous-solution is 0.01 to 2 M.

13. The method for manufacturing the water-dispersible graphene nanosheet according to claim 10, wherein the basic salt comprises at least one selected from the group consisting of lithium hydroxide, sodium hydroxide, potassium hydroxide, ammonium hydroxide, lithium carbonate, sodium carbonate, and potassium carbonate.

14. The method for manufacturing the water- dispersible graphene nanosheet according to claim 10, wherein in the water-dispersible graphene nanosheet, at least a part of the end portion of the basal plane of the carbon layer is sulfated.

\* \* \* \* \*